United States Patent Office 3,089,891
Patented May 14, 1963

3,089,891
ORGANIC PHOSPHORUS COMPOUNDS
Gail H. Birum, Dayton, Ohio, assignor to Monsanto Chemical Company, St. Louis, Mo., a corporation of Delaware
No Drawing. Filed June 28, 1960, Ser. No. 39,239
19 Claims. (Cl. 260—461)

This invention is directed to the preparation of new sulfur-containing organic compounds of phosphorus. More specifically, this invention is directed to new phosphoranoate esters, their preparation, and uses.

It is an object of this invention to provide new sulfur-containing phosphoranoate esters. It is a further object of this invention to provide insecticidal compositions containing as an active ingredient therein new sulfur-containing phosphoranoate esters. It is yet another object of this invention to provide a method for destroying insects comprising exposing said insects to a toxic quantity of a new sulfur-containing phosphoranoate ester. Other objects and advantages of this invention will be apparent from a consideration of the accompanying disclosure and the appended claims.

According to this invention there are provided as new compounds, phosphoranoate esters of the structure

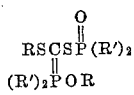

wherein R is selected from the group consisting of aryl, haloaryl, and alkaryl radicals having from 6 to 12 carbon atoms, R' is selected from the group consisting of hydrocarbyl, hydrocarbyloxy, and halohydrocarbyloxy radicals having from 1 to 6 carbon atoms, and R" is selected from the groups consisting of aliphatic and halogen-substituted aliphatic radicals having from 1 to 6 carbon atoms.

Further in accordance with this invention, an aryl, haloaryl, or an alkaryl chlorodithioformate is reacted with a neutral ester of a trivalent phosphorus acid having at least one aliphatic or halogen-substituted aliphatic radical of from 1 to 6 carbon atoms which is bonded through oxygen to the phosphorus atom according to the following general equation

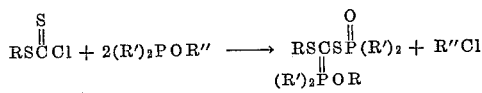

wherein R, R', and R" are as defined above.

Further, in accordance with this invention there are provided new insecticidal compositions, containing as an essential active ingredient, a sulfur-containing phosphor-anoate ester of the above general formula.

Further in accordance with this invention, there is provided a method for killing insects which comprises exposing said insects to a toxic quantity of a sulfur-containing phosphoranoate ester of the above general formula.

The compounds of this invention have the characteristic structure

which contains a phosphorus to carbon double bond and two phosphorus atoms, each differing from the other with respect to its substituents. The nature of the radicals that satisfy the indicated free valences of the phosphorous atoms depends upon the type of trivalent phosphorus ester that is used as the starting material. These compounds may be named as substituted methylene derivatives of phosphoranoic, phosphorandioic, and phosphoranetrioic acids, the name being dependent upon the type of trivalent phosphorus ester that is used as a starting material. Thus, the compound having the structure

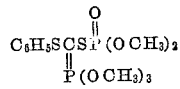

is trimethyl [(phenylthio)(dimethoxyphosphinylthio) methylene]phosphoranetrioate, while the compound having the structure

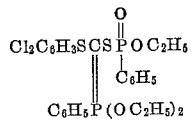

is diethyl [(dichlorophenylthio)(ethoxyphenylphosphinyl-thio)methylene]phenylphosphoranedioate, and the compound having the structure

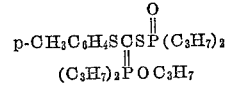

is propyl [(p-methylphenylthio)(dipropylphosphinylthio) methylene]dipropylphosphoranoate.

The trivalent phosphorus esters useful for the purpose of preparing the compounds of this invention are the phosphite, phosphonite, and phosphinite esters having at least one aliphatic or halogen-substituted aliphatic radical which is bonded through an oxygen atom to the phosphorus atom and contains from 1 to 6 carbon atoms. The remaining valences of the phosphorus ester starting material may be satisfied by hydrocarbyl, hydrocarbyloxy, or halohydrocarbyloxy groups having from 1 to 6 carbon atoms. Phosphite esters are preferred for reasons of economy and ready availability. However, the phosphonite and phosphinite esters may also be used. Alkyl and haloalkyl phosphite useful for the preparation of the present compounds are the simple or mixed trialkyl phosphites such as trimethyl, triethyl, tri-n-propyl, triisopropyl, tri-n-butyl, tri-tert-butyl, tri-n-amyl, triisoamyl, tricyclohexyl, trihexyl, dimethyl ethyl, di-n-propyl methyl, butyl dimethyl, amyl diethyl, ethyl methyl propyl, diethyl cyclohexyl, 4-chlorocyclohexyl diethyl, and ethyl hexyl methyl phosphites; the simple or mixed haloalkyl phosphites such as tris(2-chloroethyl), tris(2-bromopropyl), tris(2,2,2-trichloroethyl), tris(3-iodopropyl), tris(2-fluoroethyl), tris(2,3,3-trichloropropyl), tris(2-bromo-3-chloropropyl), and tris(6-bromohexyl) phosphites; and phosphites in which both alkyl and haloalkyl radicals are present such as diethyl 2-chloropropyl phosphite or bis(4-chlorobutyl) propyl phosphite.

Examples of phosphite esters containing aromatic radicals therein that may be used in this invention are compounds such as methyl diphenyl phosphite, diethyl phenyl phosphite, isopropyl 2-chloropropyl phenyl phosphite, n-butyl 4-bromoamyl 4-chlorophenyl phosphite, bis(2-chloroethyl) phenyl phosphite, bis(4-iodohexyl) 2-chlorophenyl phosphite, and 3-fluorobutyl bis(2-chlorophenyl) phosphite.

Other phosphite esters that may be used are, e.g., those having olefinic unsaturation therein; that is, phosphite esters containing alkenyl, alkadienyl, and/or cycloalkenyl radicals having from 1 to 6 carbon atoms therein. Examples of such compounds are triallyl, tris(3-pentenyl), diallyl methyl, bis(2-butenyl) ethyl, bis(3-hexenyl) propyl, bis(2-chloro-3-pentenyl) propyl, diethyl 2-butenyl, bis(2,4-butadienyl) propyl, diethyl 3-cyclohexenyl, and diallyl 3-chlorohexyl phosphites.

Phosphite esters having acetylenic unsaturation in the ester radical can also be used. Examples of such compounds are: tris(2-butynyl), tris(3-hexynyl), diethyl 2-butynyl, bis(2-chloropropyl)3-pentynyl, bis(4-hexynyl) 2-bromopropyl, and propyl 2-propynyl 2-chloropropyl phosphites.

Phosphonite esters having at least one aliphatic or halogen-substituted aliphatic radical bonded through oxygen to the phosphorus atom will also react with the chlorine-containing organic sulfur compounds described above to provide compounds of the invention. Examples of phosphonite esters that may be used are the simple or mixed alkyl phosphonites, e.g., dimethyl methyl-, diethyl ethyl-, di-n-propyl propyl-, and ethyl hexyl butylphosphonites; the haloalkyl phosphonites such as bis(2-chloroethyl) ethyl-, bis(2,3-dichloropropyl) ethyl-, bis(4-bromohexyl) hexyl-, ethyl 2-iodopropyl ethyl-, and bis(2-bromoethyl) amyl phosphonites; the cycloalkyl phosphonites such as ethyl cyclohexyl ethyl-, dicyclopentyl propyl-, and bis(2-chloropropyl) cyclohexylphosphonites. Phosphonite esters containing olefinic unsaturation in the hydrocarbyl groups may also be used; e.g., bis(2-butenyl) 2-butenyl-, diallyl allyl-, diallyl ethyl-, dimethyl 4-hexenyl-, propyl 2-butenyl propyl-, diethyl 1,3-butadienyl-, and bis(2-chloroethyl) 3-cyclohexenylphosphonites. Examples of phosphonite esters containing acetylenic unsaturation which may be used are bis(3-pentynyl) ethyl-, dipropyl 2-butynyl-, bis(2-bromo-4-hexynyl) methyl-, propyl 2-propynyl propyl-, and 3-pentynyl allyl ethylphosphonites. Phosphonite esters containing aromatic radicals may also be used; e.g., allyl phenyl phenyl-, ethyl phenyl phenyl-, 2-chlorophenyl propyl ethyl-, 2-chloroethyl phenyl cyclohexyl-, bis(2-chloropropyl) phenyl-, and bis(2,3-dichloropropyl) phenylphosphonites.

Although less commonly available at the present time, phosphinite esters may also be used to prepare compounds of the present invention by reaction with chlorine-containing organic sulfur compounds described above. Such phosphinite esters useful in this invention are those having organic radicals the same as those described above in more detail for the phosphite and phosphonite esters. However, for purposes of illustration, a few examples of phosphinite esters useful in this invention are ethyl dimethyl-, allyl diethyl-, 2-chloroethyl diphenyl-, propyl hexylphenyl-, 2-chloropropyl dibutyl-, amyl bis(3-pentynyl)-, and 2-propynyl diphenylphosphinites.

Any of the types of trivalent phosphorus esters listed above may be reacted with a chlorodithioformate compound having an aryl, haloaryl, or alkylaryl radical of from 6 to 12 carbon atoms attached thereto to prepare the compounds of this invention. Examples of such chlorodithioformate compounds that may be used are, e.g., phenyl, tolyl, o-, m-, or p-xylyl, mesityl, tetramethylphenyl, pentamethylphenyl, 2-, 3-, or 4-ethyl, or butylphenyl, naphthyl, and biphenyl chlorodithioformates; compounds having in the aryl or alkaryl radicals substituents such as the chloro, nitro, cyano, and alkoxy radicals, for example, 5-bromoamylphenyl, 3-cyanopropylphenyl, 2- 3-, 4-chlorophenyl, 2,3-dichlorophenyl, 2,4-dibromophenyl, 2,3,4,5-tetrachlorophenyl, pentachlorophenyl, 2-, 3-, or 4-nitrophenyl, 2,4-dinitrophenyl, 2-chloro-4-nitrophenyl, 4-bromo-4'-xenyl, 2-chloroethyl-4-tolyl, 2-nitropropyl phenyl, β-ethoxynaphthyl, and 2-chloro-4-ethoxybenzyl chlorodithioformates.

When the selected trivalent phosphorus ester used as the starting material in the reaction with a chlorodithioformate compound is a phosphite ester, as defined above, the product obtained is a phosphoranetrioate ester, examples of which are:

Trimethyl [(phenylthio)(dimethoxyphosphinylthio)methylene]phosphoranetrioate, obtained by reacting phenyl chlorodithioformate with trimethyl phosphite;

Tris(2-chlorobutyl) {(p-chlorophenylthio)[bis(2-chlorobutoxy)phosphinyl]methylene}phosphoranetrioate, obtained by reacting p-chlorophenyl chlorodithioformate and tris(2-chlorobutyl) phosphite;

Triallyl [(p-tolylthio)(diallyloxyphosphinylthio)-methylene]phosphoranetrioate, obtained by reacting p-tolyl chlorodithioformate and triallyl phosphite;

Tris(2 - butynyl){(pentachlorophenylthio)[bis(2-butynyloxy)phosphinylthio]methylene}phosphoranetrioate, obtained by reacting pentachlorophenyl chlorodithioformate and tris(2-butynyl) phosphite; and Bis(2-chloro-3-pentenyl) propyl {(phenylthio)[bis(2-chloro - 3 - pentenyloxy)phosphinylthio]methylene}phosphoranetrioate, obtained by reacting phenyl chlorodithioformate and bis(2-chloro-3-pentenyl) propyl phosphite.

Examples of products obtained when the trivalent phosphorous ester used as the starting material in the reaction with the chlorodithioformate reactant is a phosphonite ester having at least one aliphatic or halogen-substituted aliphatic radical bonded through an oxygen atom to the phosphorus atom are:

Diethyl [(p-bromophenylthio)(ethoxyphenylphosphinylthio)methylene]phenylphosphoranedioate, obtained by reacting p-bromophenyl chlorodithioformate with diethyl phenylphosphonite;

Dihexyl [(xylylthio)(hexyloxyhexylphosphinylthio)-methylene]hexylphosphoranedioate, obtained by reacting xylyl chlorodithioformate with dihexyl hexylphosphonite;

Bis(2 - bromopropyl) {(naphthylthio)[2 - bromopropoxy) - propylphosphinylthio]methylene}propylphosphoranedioate, obtained by reacting naphthyl chlorodithioformate with bis(2-bromopropyl) propylphosphonite;

Cyclohexyl ethyl [(phenylthio)(cyclohexyloxyethylphosphinylthio)methylene]ethylphosphoranedioate, obtained by reacting phenyl chlorodithioformate and cyclohexyl ethyl ethylphosphonite;

Bis(2-butenyl) {(p-iodophenylthio)[2 - butenyloxy)(2-butenyl)phosphinylthio]methylene}(2 - butenyl)phosphoranedioate, obtained by reacting p-iodophenyl chlorodithioformate with bis(2-butenyl) 2-butenylphosphonite; and Bis(3 - hexynyl) {(biphenylthio)[(3 - hexynyloxy)(3-hexynyl) - phosphinylthio]methylene}(3 - hexynylphosphoranedioate, obtained by reacting biphenyl chlorodithioformate with bis(3-hexynyl) 3-hexynylphosphonite.

When the trivalent phosphorus ester used as the starting material in the reaction of this invention is a phosphinite ester having one aliphatic or halogen-substituted aliphatic radical bonded through an oxygen atom to the phosphorus atom, the product obtained is a phosphoranoic acid ester, a few examples of which are:

Propyl [(phenylthio)(dipropylphosphinylthio)methylene]-dipropylphosphoranoate, obtained by reacting phenyl chlorodithioformate with propyl dihopylphosphinite;

2 - chlorobutyl [(naphthylthio)(diphenylphosphinylthio)-methylene]diphenylphosphoranoate, obtained by reacting naphthyl chlorodithioformate and 2-chlorobutyl diphenylphosphinite;

Allyl [(p - chlorophenylthio)(diallylphosphinylthio)-methylene]diallylphosphoranoate, obtained by reacting p-chlorophenyl chlorodithioformate and allyl diallylphosphinite; and Amyl {(p - tolylthio)[bis(2-pentynyl)phosphinylthio]-methylene}bis(2-pentynyl)phosphoranoate, obtained by reacting p-tolyl chlorodithioformate with amyl bis(2-pentylnyl)phosphinite.

Formation of the desired product, that is, a phosphoranoate ester of the above defined type is accompanied by the formation of a halogenated alkane by-product. Thus, the reaction of, say, phenyl chlorodithioformate and triethyl phosphite gives ethyl chloride as a by-product;

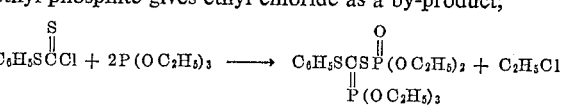

The by-product halogenated alkanes are generally articles of commerce for which many applications exist. Thus, while many currently employed processes for the manufacture of organic compounds of phosphorus entail substantial waste of halogen in that by-products of little commercial importance are formed, in the present process all of the halogen constituent of the raw materials is converted to products of economic importance.

Reaction of esters of trivalent phosphorus acids with aryl, halogen-substituted aryl, or alkaryl chlorodithioformates occurs readily at ordinary, decreased, or increased temperatures within the range of about 0° C. to about 150° C., with temperatures on the order of from 20° C. to 75° C. being preferred in most cases. Although cooling is not necessary, once the reaction has started, it is usually preferred to apply some cooling to minimize the formation of decomposition products that might result from operation at unnecessarily high temperatures. When employing the more active compounds, reaction may be essentially complete at ordinary temperature or below, but it is usually preferred to apply external heating after the initial exothermic reaction has subsided. The degree of heating will depend upon the nature of the reactants but will generally vary to below the decomposition point of the reaction mixture. Temperatures of up to 150° C. may be useful when employing the less reactive starting materials. In some instances, particularly when employing the higher molecular weight chlorodithioformate reactants, the use of an inert solvent or diluent is advantageous. Such inert solvents or diluents may be, for example, benzene, hexane, xylene, ether, etc. While the reactants are advantageously employed in stoichiometric proportions, such proportions need not be employed since any unreacted material is readily recovered from the reaction products.

The present phosphoranoate esters are stable, well defined compounds which range from viscous liquids to waxy or crystalline solids. They may be advantageously employed for a variety of industrial purposes, but are particularly useful as the active ingredient in insecticidal compositions. As herein shown the present compounds are particularly toxic to mites and leaf-feeding insects when applied as a spray. They also possess significant systemic action. When using the compounds of the present invention in insecticidal compositions, or in other applications, removal of the by-product may be unnecessary. In fact, there may be advantages in retaining the by-products in the major product.

The products of the present invention are very chemically reactive as a result of the presence of a double bond connected to a carbon atom and to a phosphorus atom of an ester. Consequently, these compounds are useful as intermediates for the synthesis of many new organophosphorus compounds not previously available.

Other applications in which the products of the present invention are useful are as oil additives, gasoline additives, antioxidants, stabilizers, and fire retardant additives for various polymer systems.

Since the presently provided compounds are effective biological toxicants when employed in very small concentrations, commercial toxicants comprising one of the compounds of this invention may contain only minor proportions thereof. When they are employed as herbicides, oil-in-water emulsions containing the compounds in concentrations of from 0.1 to 2.0% by weight of the total weight of the emulsions are useful. The word "oil" is here used to designate any organic liquid which is insoluble in water. Emulsifying agents which may be employed are those used in the art for the preparation of oil-in-water emulsions. Examples of emulsifying agents which may be used include long-chained alkylbenzenesulfonates, polyalkylene glycols, long-chained alkyl sulfosuccinates, etc. For use as insecticides, the present substituted-methylene phosphoranoate compounds are also very advantageously applied in oil-in-water emulsions. However, for these and related biological toxicant purposes, these phosphorus compounds may be incorporated into inert carriers generally. Thus, they may be mixed with solid carriers such as clay, talc, pumice and bentonite to give toxicant compositions which may be applied as dusts. It has been found, however, that the emulsions possess an improved tendency to adhere to treated surfaces so that less of the active ingredients, i.e., the substituted-methylene phosphoranoate ester, is required when applied in emulsion form.

The invention is further illustrated, but not limited, by the following examples.

*Example 1*

A 27.1 g. (0.075 mole) portion of pentachlorophenyl chlorodithioformate and 75 ml. of benzene were placed in a 500 ml. flask and stirred as 26.6 g. (0.16 mole) of redistilled triethyl phosphite was added in about 2 minutes. The temperature increased spontaneously to 47° C. The reaction mixture was stirred for 0.75 hour and then warmed to 70° C. Most of the benzene was removed under water pump vacuum. The residue crystallized to a yellow solid. This was recrystallized from hexane to obtain 38.0 g. of a light yellow solid, M.P. 106–107° C., which was triethyl [(pentachlorophenylthio)(diethoxyphosphinylthio)methylene]phosphoranetrioate,

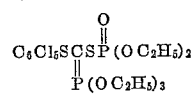

|   | Found | Anal. calc'd for $C_{17}H_{25}Cl_5O_6P_2S_2$ |
|---|---|---|
| C_____percent__ | 32.63 | 32.5 |
| H_____do____ | 4.17 | 4.0 |
| Cl_____do____ | 28.20 | 28.2 |
| P_____do____ | 9.76 | 9.8 |
| S_____do____ | 10.04 | 10.2 |

*Example 2*

To a 500 ml. flask was charged 18.0 g. (0.05 mole) of pentachlorophenyl chlorodithioformate and 150 ml. of benzene. Diethyl phenylphosphonite, 21.8 g. (0.11 mole), was then added in 0.2 hour with cooling at 20 to 32° C. The reaction mixture was warmed to 70° C. and concentrated under vacuum. The yellow residue was recrystallized from hexane to give 28.2 g. of a yellow solid, M.P. 127–128° C., which was diethyl [(pentachlorophenylthio)(ethoxyphenylphosphinylthio)methylene]phenylphosphoranedioate,

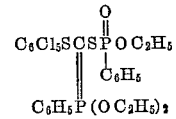

|   | Found | Anal. calc'd for $C_{25}H_{25}Cl_5O_4P_2S_2$ |
|---|---|---|
| C_____percent__ | 43.32 | 43.3 |
| H_____do____ | 3.82 | 3.6 |
| Cl_____do____ | 25.45 | 25.6 |
| P_____do____ | 8.90 | 8.9 |
| S_____do____ | 9.19 | 9.2 |

*Example 3*

A 10.5 g. (0.0490 mole) portion of methyl diphenylphophinite and 50 ml. of benzene were placed in a flask, and 4.6 g. (0.0245 mole) of phenyl chlorodithioformate was added all at once at 24° C. The temperature increased spontaneously to 44° C. The reaction mixture was warmed to 70° C. and then concentrated to 60° C./1 mm. to give a tan residue. This was crystallized three times from hexane-benzene to give a white crystalline solid, M.P. 166–168° C. The product was methyl

[(phenylthio)(diphenylphosphinylthio)methylene]diphenylphosphoranoate, $$\underset{\underset{(C_6H_5)_2\overset{\parallel}{P}OCH_3}{}}{C_6H_5S\overset{O}{\overset{\parallel}{C}}S\overset{}{P}(C_6H_5)_2}$$

|   | Found | Anal. calc'd for $C_{32}H_{28}O_2P_2S_2$ |
|---|---|---|
| C......percent.. | 67.68 | 67.40 |
| H......do.... | 4.96 | 4.95 |
| Cl......do.... | 0.00 | 0.00 |
| P......do.... | 10.63 | 10.88 |
| S......do.... | 11.00 | 11.23 |

Example 4

Freshly distilled triethyl phosphite, 415 g. (2.5 moles), was placed in a dry, 1-liter, 4-necked flask and cooled and stirred as the addition of 226.5 g. (1.2 moles) of phenyl chlorodithioformate was started at 10° C. The temperature of the mixture was allowed to increase until at about 20° C. to 25° C. an exothermic reaction set in, and the temperature increased spontaneously to 43° C. even while cooling in ice. The remainder of the formate reactant was then added in about 0.5 hour while cooling in ice at 35 to 40° C. When the bath was removed after addition, the temperature increased spontaneously to 49° C. The reaction mixture was stirred and warmed to 70° C. in 0.5 hour and then concentrated to a temperature of 91° C./2 mm. with stirring to give 555.5 g. (theoretical 548 g.). This residue had an index of refraction of $n_D^{25}$ 1.5310 and was substantially pure triethyl [(phenylthio)(diethoxyphosphinylthio)methylene] - phosphoranetrioate, having the structure

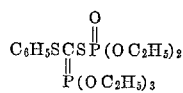

|   | Found | Anal. calc'd for $C_{17}H_{30}O_6P_2S_2$ |
|---|---|---|
| C......percent.. | 44.84 | 44.8 |
| H......do.... | 6.78 | 6.6 |
| P......do.... | 13.59 | 13.6 |
| S......do.... | 14.29 | 14.0 |

Example 5

Tris(2-chloropropyl) phosphite, 43.5 g. (0.140 mole), was placed in a flask and stirred as 15.6 g. (0.070 mole) of p-chlorophenyl chlorodithioformate was added in 0.1 hour. The temperature increased spontaneously to 51° C. When the exothermic reaction had subsided, the mixture was warmed to 100° C./0.5 mm. to give as residue 50.7 g. (99% of theory) of substantially pure tris(2-chloropropyl){(p-chlorophenylthio)[bis(2-chloropropoxy)phosphinylthio]methylene}phosphoranetrioate,

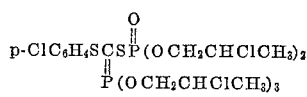

which analyzed as follows:

|   | Found | Anal. Calc'd for $C_{22}H_{34}Cl_6O_6P_2S_2$ |
|---|---|---|
| C......percent.. | 35.86 | 36.1 |
| H......do.... | 4.89 | 4.7 |
| Cl......do.... | 29.13 | 29.1 |
| P......do.... | 8.28 | 8.4 |
| S......do.... | 8.63 | 8.7 |
| O......do.... | [1]13.21 | 13.1 |

[1] By difference.

Example 6

Freshly distilled triethyl phosphite, 207.5 g. (1.25 moles) was placed in a reaction flask and stirred and cooled at 133.8 g. (0.60 mole) of p-chlorophenyl chlorodithioformate was added in 0.3 hour at 35 to 40° C. The temperature increased spontaneously to 48° C. when the bath was removed. The reaction mixture was then warmed to 90° C. and finally concentrated to a pot temperature of 120° C./0.05 mm. to give 296.4 g. (theoretical, 294 g.) of an orange liquid residue which was substantially pure triethyl [(p-chlorophenylthio)(diethoxyphosphinylthio)methylene]phosphoranetrioate,

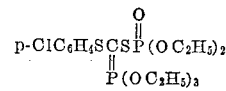

Example 7

Redstilled trimethyl phosphite, 62 g. (0.50 mole), was placed in a flask, and 45.0 g. (0.20 mole) of p-chlorophenyl) chlorodithioformate was added in 0.2 hour with cooling at 18 to 30° C. After the addition was completed, cooling was used for about 0.1 hour to keep the temperature below 35° C. The yellow reaction mixture was then warmed at 60 to 65° C. for 0.5 hour and then concentrated with stirring to a pot temperature of 100° C./0.1 mm. to give 80.5 g. (theoretical 85.0 g.) of a yellow viscous liquid residue, $n_D^{25}$ 1.5689, which was trimethyl [(p-chlorophenylthio)(dimethoxyphosphinylthio)methylene]phosphoranetrioate.

Example 8

Hexane (100 ml.) and 14.1 g. (0.075 mole) of phenylchlorodithioformate were placed in a reaction flask, cooled in ice, and then 24.8 g. (0.20 mole) of trimethyl phosphite was added in 0.2 hour at 3 to 4° C. The temperature was allowed to rise until at about room temperature an exothermic reaction set in, raising the temperature to about 35° C. After the exothermic reaction had subsided, the reaction mixture was refluxed (about 67° C.). After refluxing for 0.5 hour, the hexane was distilled until the pot temperature reached 74° C. The residue was concentrated to 105° C./1 mm., giving 29.2 g. of a red liquid having an index of refraction of $n_D^{25}$ 1.5539. The product was trimethyl [(phenylthio)(dimethoxyphosphinylthio)methylene]phosphoranetrioate,

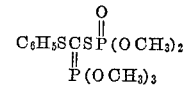

Example 9

Testing of samples of the compound trimethyl [(phenyl - thio)(dimethoxyphosphinylthio)methylene]phosphoranetrioate as a plant spray insecticide was conducted as follows. Emulsion concentrates were prepared by dissolving first the compound and then an emulsifying agent in acetone. Water was added to the concentrate to give a preparation containing 0.1% (w./v.) of the test chemical. Serial dilutions of 0.05% and 0.025% were prepared by addition of appropriate volumes of water and emulsifier so that the emulsifier concentration remained constant. In each case the emulsifier, employed in a quantity of 0.02% by weight, based on the weight of the total emulsion, was a mixture of a higher alkylbenzenesulfonate and a polyalkylene glycol known to the trade as "Emulsifier L." Potted bean plants were respectively sprayed to run-off with the emulsions. As soon as the foliage of the sprayed bean plants was dry, leaves were excised, the petioles placed in water filled vials, and ten larvae of the Mexican bean beetle placed on the leaf. Observations for mortaility were made after 48 hours. The results were as follows:

| Percent, weight/volume: | Percent kill |
|---|---|
| 0.1 | 90 |
| 0.05 | 100 |
| 0.0025 | 90 |

In still another insecticide test, bean plants which had been infested with the 2-spotted spider mite were sprayed with similarly prepared 0.013% and 0.0063%, respectively, emulsions of the compound trimethyl [(phenylthio)(dimethoxyphosphinylthio)methylene]phosphoranetrioate. The sprayed plants were held 48 hours for observation of kill of mobile stages and 7 days for observation for kill of resting forms and eggs and to determine residual effect on the population. At the end of that period, plants which had been sprayed with the 0.013% and the 0.0063% emulsions of the test compound gave the following results:

| 2-spotted spider mite | Percent kill at concentration of test compound | |
|---|---|---|
| | 0.013% by weight | 0.0063% by weight |
| Mobile stages | 100 | 97 |
| Resting stages | 97 | 97 |
| Eggs | 97 | 50 |
| Residual activity | 97 | 50 |

In still another evaluation of this compound, a 0.001% (w./v.) solution gave a 96% kill of larvae of the yellow fever mosquito.

The systemic insecticidal effect of this compound on bean beetle larvae and 2-spotted spider mites, was tested as follows. Black Valentine bean plants in the second leaf stage were cut and held for 3 days in duplicate respective aqueous solutions of 0.004% by weight concentration of trimethyl [(phenylthio)(dimethoxyphosphinylthio)methylene]phophoranetrioate. The leaves were then excised with long petioles and transferred to fresh water and five Mexican bean beetle larvae were transferred to each of one set of duplicate test plants and 20 to 50 mites to the other of the duplicate test plants. Observation at the end of 3 days showed a 100% kill of the beetles and a 97% kill of the mites.

*Example 10*

Emulsions of triethyl [(phenylthio)(diethoxyphosphinylthio)methylene]phosphoranethioate were prepared in a manner similar to that used in the preceding example.

In one test, this compound was evaluated against yellow fever mosquito larvae and gave the following results.

| Percent concentration: | Percent kill |
|---|---|
| $2.5 \times 10^{-4}$ | 100 |
| $1.3 \times 10^{-4}$ | 96, 88 |
| $6.3 \times 10^{-5}$ | 36 |

In another test, when the compound was sprayed on bean plants which had been infested with 2-spotted spider mites, the following results were obtained:

| Two-spotted spider mite | Percent kill at the indicated concentration | |
|---|---|---|
| | 0.025% | 0.013% |
| Mobile stages | 100 | 100 |
| Resting stages | 100 | 100 |
| Eggs | 100 | 97 |
| Residual activity | 100 | 50 |

In another test of the compound, varying concentrations (from 1% acetone solutions) were evaluated for residual action against large milkweed bug nymphs (*Oncopeltus fasciatus*), and red flour beetle adults (*Tribolium confusium*).

| Organism | Percent kill at the indicated concentration | | | |
|---|---|---|---|---|
| | 1.0% | 0.5% | 0.25% | 0.13% |
| Milkweed bugs | 100 | 100 | 100 | 80 |
| Red flour beetles | 80 | 80 | | |

Reasonable variation and modification of the invention as described are possible, the essence of which is that there have been provided (1) sulfur containing phosphoranoate ester compounds, (2) methods for making said compounds, (3) insecticidal compositions comprising as the essential active ingredient, a compound of the above type, and (4) methods for destroying insects.

I claim:
1. Compounds having the formula

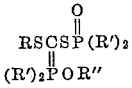

wherein R is selected from the group consisting of aryl, haloaryl, and alkylaryl radicals having from 6 to 12 carbon atoms in each of said aryl, haloaryl and alkylaryl radicals, R' is selected from the group consisting of hydrocarbyl, hydrocarbyloxy, and halohydrocarbyloxy radicals having from 1 to 6 carbon atoms, and R" is selected from the group consisting of aliphatic hydrocarbon and halogen-substituted aliphatic radicals having from 1 to 6 carbon atoms.

2. Compounds having the formula

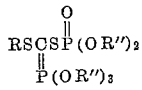

wherein R is selected from the group consisting of aryl, haloaryl, and alkylaryl radicals having from 6 to 12 carbon atoms in each of said aryl, haloaryl and alkylaryl radicals, and R" is selected from the group consisting of aliphatic hydrocarbon and halogen-substituted aliphatic radicals having from 1 to 6 carbon atoms.

3. Compounds having the formula

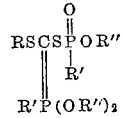

wherein R is selected from the group consisting of aryl, haloaryl, and alkylaryl radicals having from 6 to 12 carbon atoms in each of said aryl, haloaryl and alkylaryl radicals, R" is selected from the group consisting of aliphatic hydrocarbon and halogen-substituted aliphatic hydrocarbon radicals having from 1 to 6 carbon atoms, and R' is a hydrocarbyl radical having from 1 to 6 carbon atoms.

4. Compounds having the formula

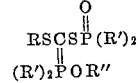

wherein R is selected from the group consisting of aryl, haloaryl, and alkylaryl radicals having from 6 to 12 carbon atoms in each of said aryl, haloaryl and alkylaryl radicals, R" is selected from the group consisting of aliphatic hydrocarbon and halogen-substituted aliphatic hydrocarbon radicals having from 1 to 6 carbon atoms, and each R' is a hydrocarbyl radical having from 1 to 6 carbon atoms.

5. Trimethyl [phenylthio(dimethoxyphosphinylthio)-methylene]phosphoranetrioate of the structure

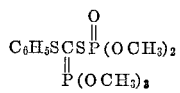

6. Triethyl [phenylthio(diethoxyphosphinylthio)methylene]phosphoranetrioate of the structure

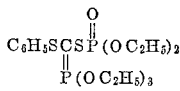

7. Triethyl [pentachlorophenylthio(diethoxyphosphinylthio)methylene]phosphoranetrioate of the structure

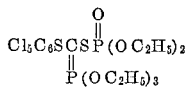

8. Methyl [phenylthio(diphenylphosphinylthio)-methylene]diphenylphosphoranoate of the structure

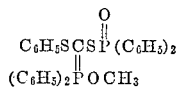

9. Diethyl [pentachlorophenylthio(ethoxyphenylphosphinylthio)methylene]phosphoranedioate of the structure

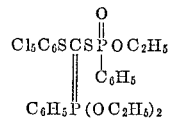

10. The method which comprises reacting an ester of a trivalent phosphorus acid of the formula $$(R')_2POR''$$

wherein R' is selected from the group consisting of hydrocarbyl, hydrocarbyloxy, and halohydrocarbyloxy radicals having from 1 to 6 carbon atoms, and R" is selected from the group consisting of aliphatic hydrocarbon and halogen-substituted aliphatic hydrocarbon radicals having from 1 to 6 carbon atoms, with a chlorodithioformate compound of the formula

wherein R is selected from the group consisting of aryl, haloaryl, and alkylaryl radicals having from 6 to 12 carbon atoms in each of said aryl, haloaryl and alkylaryl radicals, and recovering from the resulting reaction mixture a compound having the formula

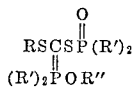

wherein R, R', and R" are as above defined.

11. The method which comprises reacting a trialkyl phosphite ester having from 1 to 6 carbon atoms in each of the alkyl groups with a chlorodithioformate compound having the formula

wherein R is selected from the group consisting of aryl, haloaryl, and alkylaryl radicals having from 6 to 12 carbon atoms in each of said aryl, haloaryl and alkylaryl radicals, and recovering from the resulting reaction mixture a compound having the formula

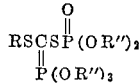

wherein R" is an alkyl radical having from 1 to 6 carbon atoms in each radical.

12. The method which comprises reacting trimethyl phosphite with phenyl chlorodithioformate, and recovering from the resulting reaction mixture trimethyl [phenylthio(dimethoxyphosphinylthio) methylene] phosphoranetrioate.

13. The method which comprises reacting triethyl phosphite with pentachlorophenyl chlorodithioformate, and recovering from the resulting reaction mixture triethyl[pentachlorophenylthio(diethoxyphosphinylthio) - methylene]phosphoranetrioate.

14. The method which comprises reacting methyl diphenylphosphinite with phenyl chlorodithioformate and recovering from the resulting reaction mixture methyl [phenylthio) diphenylphosphinylthio) methylene] diphenylphosphoranoate.

15. The method which comprises reacting diethyl phenylphosphonite with pentachlorophenyl chlorodithioformate and recovering from the resulting reaction mixture diethyl [pentachlorophenylthio(ethoxyphenylphosphinylthio)methylene]phenylphosphoranedioate.

16. A compound according to claim 2 wherein R is an aryl radical having from 6 to 12 carbon atoms, and each R" is an alkyl radical having from 1 to 6 carbon atoms.

17. A compound according to claim 2 wherein R is a haloaryl radical having from 6 to 12 carbon atoms and each R" is an alkyl radical having from 1 to 6 carbon atoms.

18. A compound according to claim 3 wherein R is an haloaryl radical having from 6 to 12 carbon atoms, R' is phenyl, and each R" is an alkyl radical having from 1 to 6 carbon atoms.

19. A compound according to claim 4 wherein R is an aryl radical having from 6 to 12 carbon atoms, R' is phenyl, and R" is an alkyl radical having from 1 to 6 carbon atoms.

References Cited in the file of this patent

UNITED STATES PATENTS

| | | |
|---|---|---|
| 2,807,636 | Buls et al. | Sept. 24, 1957 |
| 2,857,305 | Birum | Oct. 21, 1958 |
| 2,857,415 | Birum | Oct. 21, 1958 |
| 2,891,887 | Gilbert | June 23, 1959 |